United States Patent
Satoh

(10) Patent No.: US 10,687,187 B2
(45) Date of Patent: Jun. 16, 2020

(54) INFORMATION PROCESSING SYSTEM CONFIGURED TO DETERMINE USABILITY OF AN APPLICATION, INFORMATION PROCESSING APPARATUS, AND INFORMATION PROCESSING METHOD

(71) Applicant: Yoshimi Satoh, Tokyo (JP)

(72) Inventor: Yoshimi Satoh, Tokyo (JP)

(73) Assignee: Ricoh Company, Limited, Tokyo (JP)

( * ) Notice: Subject to any disclaimer, the term of this patent is extended or adjusted under 35 U.S.C. 154(b) by 355 days.

(21) Appl. No.: 14/969,534

(22) Filed: Dec. 15, 2015

(65) Prior Publication Data

US 2016/0182610 A1 Jun. 23, 2016

(30) Foreign Application Priority Data

Dec. 17, 2014 (JP) .................................. 2014-255571

(51) Int. Cl.
*G06F 8/60* (2018.01)
*H04W 4/60* (2018.01)
(Continued)

(52) U.S. Cl.
CPC ................ *H04W 4/60* (2018.02); *G06F 8/60* (2013.01); *H04L 41/082* (2013.01);
(Continued)

(58) Field of Classification Search
CPC ....... H04L 41/0866–0873; H04L 67/34; G06F 8/10; G06F 8/60–71
See application file for complete search history.

(56) References Cited

U.S. PATENT DOCUMENTS 8,868,692 B1 * 10/2014 Khanna ............... H04L 41/0866 709/219
9,055,120 B1 * 6/2015 Firman ................. G06F 16/951
(Continued)

FOREIGN PATENT DOCUMENTS

JP 2010-182309 8/2010
JP 2011-170464 9/2011
(Continued)

*Primary Examiner* — David R Lazaro
*Assistant Examiner* — Julian Chang
(74) *Attorney, Agent, or Firm* — Harness, Dickey and Pierce, P.L.C.

(57) ABSTRACT

An information processing system includes: a server including: an obtaining unit configured to obtain, from an apparatus, first information including apparatus information which includes peripheral device connection information indicating whether a peripheral device is connected to the apparatus and indicates a function that the apparatus has, and application identification information which identifies an application required to be used by the apparatus; an identifying unit configured to refer to second information in which each application is associated with condition information indicating a condition necessary to use that application, and identify condition information associated with the application identified by the application identification information included in the first information; and a determining unit configured to determine whether the application identified by the application identification information included in the first information can be used based on the apparatus information included in the first information and the condition information identified by the identifying unit.

12 Claims, 10 Drawing Sheets

(51) Int. Cl.
  *H04L 12/24* (2006.01)
  *H04L 29/08* (2006.01)
(52) U.S. Cl.
  CPC ...... *H04L 41/0853* (2013.01); *H04L 41/0869* (2013.01); *H04L 67/34* (2013.01)

(56) References Cited

U.S. PATENT DOCUMENTS

| | | | | |
|---|---|---|---|---|
| 2002/0112052 | A1* | 8/2002 | Brittingham | G06F 9/44505 709/224 |
| 2005/0108703 | A1* | 5/2005 | Hellier | G06F 8/64 717/174 |
| 2005/0235282 | A1* | 10/2005 | Anderson | G06F 8/65 717/178 |
| 2007/0033089 | A1* | 2/2007 | Dharmarajan | G06F 17/30241 705/7.29 |
| 2009/0204711 | A1* | 8/2009 | Binyamin | H04L 67/16 709/226 |
| 2009/0287582 | A1* | 11/2009 | Nath | G06F 8/61 705/26.1 |
| 2010/0205274 | A1* | 8/2010 | Gharabally | G06F 8/61 709/217 |
| 2011/0136427 | A1* | 6/2011 | Al Qalqili | G06Q 30/02 455/3.01 |
| 2011/0202433 | A1 | 8/2011 | Yokoyama | |
| 2012/0200887 | A1* | 8/2012 | Osada | G06K 15/181 358/1.15 |
| 2012/0303476 | A1* | 11/2012 | Krzyzanowski | G06F 8/60 705/26.5 |
| 2013/0166417 | A1* | 6/2013 | Pulkowski | G06Q 30/04 705/27.1 |
| 2013/0167135 | A1* | 6/2013 | Neumann | G06F 9/44552 717/174 |
| 2013/0191495 | A1* | 7/2013 | Almstrand | G06F 8/64 709/217 |
| 2013/0275736 | A1* | 10/2013 | Kelley | G01D 4/004 713/1 |
| 2014/0007070 | A1* | 1/2014 | Huang | G06F 8/65 717/170 |
| 2014/0007084 | A1* | 1/2014 | Ding | G06F 8/61 717/178 |
| 2014/0122645 | A1* | 5/2014 | Brown | H04L 67/30 709/217 |
| 2014/0149565 | A1* | 5/2014 | Piegay | H04N 21/2405 709/223 |
| 2014/0195582 | A1* | 7/2014 | Sherwood | H04L 67/10 709/201 |
| 2014/0201730 | A1* | 7/2014 | Biswas | G06F 8/61 717/178 |
| 2014/0214515 | A1* | 7/2014 | Quirk | G06Q 30/0225 705/14.26 |
| 2014/0280462 | A1 | 9/2014 | Gharabally et al. | |
| 2014/0280896 | A1* | 9/2014 | Papakostas | H04W 4/001 709/224 |
| 2014/0282033 | A1* | 9/2014 | Cannon | G06F 9/4411 715/738 |
| 2014/0298310 | A1* | 10/2014 | Iijima | G06F 8/665 717/170 |
| 2014/0351147 | A1* | 11/2014 | Castrechini | G06Q 30/06 705/79 |
| 2015/0012913 | A1* | 1/2015 | Jin | G06F 8/65 717/170 |
| 2015/0082282 | A1* | 3/2015 | Larsen | G06F 11/3668 717/125 |
| 2015/0154644 | A1* | 6/2015 | Saxena | G06Q 30/0269 705/14.66 |
| 2015/0156061 | A1* | 6/2015 | Saxena | G06F 17/30864 715/733 |
| 2015/0178072 | A1* | 6/2015 | Bektas | G06F 9/44578 717/123 |
| 2015/0319222 | A1* | 11/2015 | Zamir | G06F 9/4856 709/217 |
| 2016/0036814 | A1* | 2/2016 | Conrad | H04L 63/0876 713/171 |
| 2016/0044198 | A1* | 2/2016 | Kang | H04N 1/3873 358/538 |
| 2016/0119491 | A1 | 4/2016 | Takeda | |
| 2016/0337544 | A1 | 11/2016 | Han | |
| 2017/0214781 | A1* | 7/2017 | Ichida | H04M 1/6091 |

FOREIGN PATENT DOCUMENTS

| | | |
|---|---|---|
| JP | 2016-081485 A | 5/2016 |
| JP | 2018-085859 A | 5/2016 |
| JP | 2016-212855 A | 12/2016 |
| WO | WO-2016/185725 A1 | 11/2016 |

* cited by examiner

# INFORMATION PROCESSING SYSTEM CONFIGURED TO DETERMINE USABILITY OF AN APPLICATION, INFORMATION PROCESSING APPARATUS, AND INFORMATION PROCESSING METHOD

CROSS-REFERENCE TO RELATED APPLICATIONS

The present application claims priority to and incorporates by reference the entire contents of Japanese Patent Application No. 2014-255571 filed in Japan on Dec. 17, 2014.

BACKGROUND OF THE INVENTION

1. Field of the Invention

The present invention relates to an information processing system, an information processing apparatus, and an information processing method.

2. Description of the Related Art

In recent years, various communication apparatuses represented by a mobile phone and an information portable terminal have been widely used. Therefore, an application which can be used in the communication apparatus has been actively developed. In order to promote use of these applications, a Web site and an application which can introduce the application and download and install it in the communication apparatus have been developed.

SUMMARY OF THE INVENTION

It is an object of the present invention to at least partially solve the problems in the conventional technology.

An information processing system includes: an apparatus; and a server capable of communicating with the apparatus via a network. The apparatus includes: a first information transmitting unit configured to transmit, to the server, first information including apparatus information which includes peripheral device connection information indicating whether a peripheral device is connected to the apparatus and indicates a function that the apparatus has, and application identification information which identifies an application required to be used by the apparatus. The server includes: an obtaining unit configured to obtain the first information; an identifying unit configured to refer to second information in which each application is associated with condition information indicating a condition necessary to use that application, and identify condition information associated with the application identified by the application identification information included in the first information; and a determining unit configured to determine whether the application identified by the application identification information included in the first information can be used based on the apparatus information included in the first information and the condition information identified by the identifying unit.

An information processing apparatus includes: an obtaining unit configured to obtain first information including apparatus information which includes peripheral device connection information indicating whether a peripheral device is connected to an apparatus and indicates a function of the apparatus, and application identification information which identifies an application required to be used by the apparatus; an identifying unit configured to refer to second information in which each application is associated with condition information indicating a condition necessary to use that application, and identify condition information associated with the application identified by the application identification information included in the first information; and a determining unit configured to determine whether the application identified by the application identification information included in the first information can be used based on the apparatus information included in the first information and the condition information identified by the identifying unit.

An information processing method includes: obtaining first information including apparatus information which includes peripheral device connection information indicating whether a peripheral device is connected to an apparatus and indicates a function of the apparatus, and application identification information which identifies an application required to be used by the apparatus; referring to second information in which each application is associated with condition information indicating a condition necessary to use that application, and identifying condition information associated with the application identified by the application identification information included in the first information; and determining whether the application identified by the application identification information included in the first information can be used based on the apparatus information included in the first information and the condition information identified at the identifying.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Embodiments of an information processing system, an information processing apparatus, and an information processing method according to the present invention will be described in detail below with reference to the attached drawings. As an exemplary apparatus according to the present invention, a multifunction peripheral (MFP) which is an embodiment of the image forming apparatus will be described below. However, the apparatus according to the present invention is not limited to this. The multifunction peripheral is an apparatus having a plurality of different functions such as a copy function, a scanner function, a print function, and a fax function.

Figure 1:
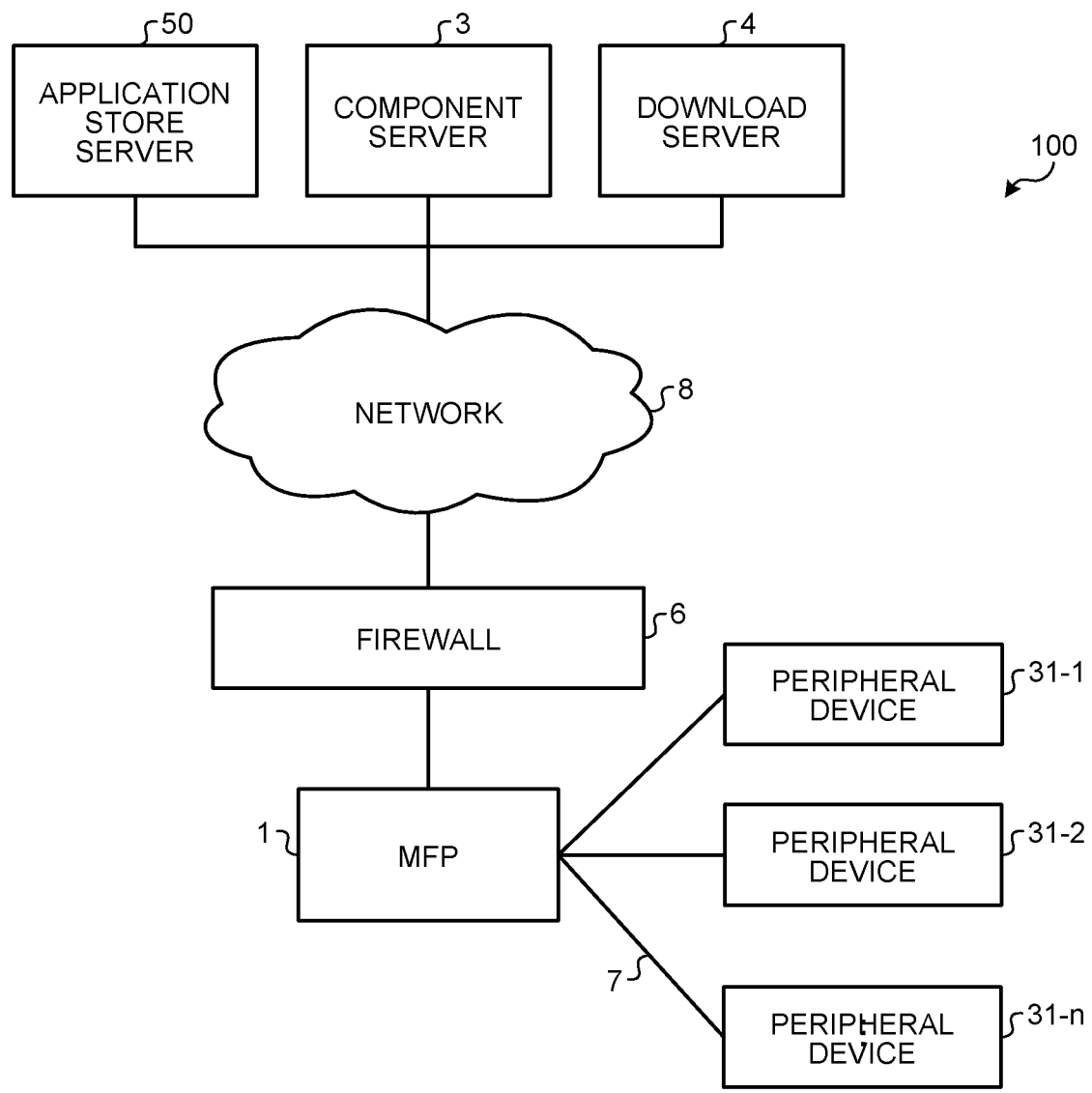
FIG. 1 is a diagram of an exemplary outline structure of an information processing system.

FIG. 1 is a diagram of an exemplary outline structure of an information processing system 100 according to the present embodiment. As illustrated in FIG. 1, the information processing system 100 includes an MFP 1, an application store server 50, a component server 3, and a download server 4 which are connected to each other via a network 8.

The MFP 1 can extend the function as needed by adding or updating an application. In the example in FIG. 1, a firewall 6 is provided between the MFP 1 and the network 8. Further, the MFP 1 can be connected to peripheral devices 31-1 to 31-n. An image processing apparatus such as a printer and a camera, a voice input/output device such as a microphone and a speaker, a card reader/writer, and/or the like are considered as the peripheral devices 31-1 to 31-n. Further, connections 7 between the MFP 1 and the peripheral devices 31-1 to 31-n may be physically and wiredly connected and may be wirelessly connected by using near field communications (NFC). In the following description, the peripheral devices 31-1 to 31-n may be simply referred to as a "peripheral device 31" when the peripheral devices 31-1 to 31-n are not distinguished from each other. A specific structure of the MFP 1 will be described later.

The application store server 50 displays a list of one or more applications and provides a Web page to make a service contract and download each application, that is, a Web page to provide the application (may be referred to as "application store 5" below) to the MFP 1. A more specific content will be described later. In this example, an application to obtain the application store 5 from the application store server 50 and display it on the MFP 1 (may be referred to as "store starting application" below) and an application for providing a function to perform control to use an application which is selected by a user from among the applications displayed in the application store 5 and is allowed to be used by the component server 3 to be described later (for example, control to download and install the application in the MFP 1) (may be referred to as "installation application" below) have been previously installed in the MFP 1. In this example, functions of the store starting application and the installation application are realized by using an application to provide a function of a Web browser (may be referred to as "browser application" below). In this example, the browser application has been previously installed in the MFP 1.

The component server 3 determines whether an application which is required to be used by the MFP 1 (for example, application required to be installed or updated) can be used. When determining that the application required to be used by the MFP 1 can be used, the component server 3 performs control to make the MFP 1 use the application. A more specific content will be described later.

The download server 4 provides the application according to a request from the MFP 1. In this example, the download server 4 holds the applications displayed on an application list screen. However, kinds of the applications held (managed) by the download server 4 are not limited to them.

For convenience of description, a single MFP 1 is exemplified as an apparatus included in the information processing system 100 in FIG. 1. However, the number and kind of the apparatuses included in the information processing system 100 are not limited to this, and the number and kind of the apparatuses can be optionally selected.

Figure 2:
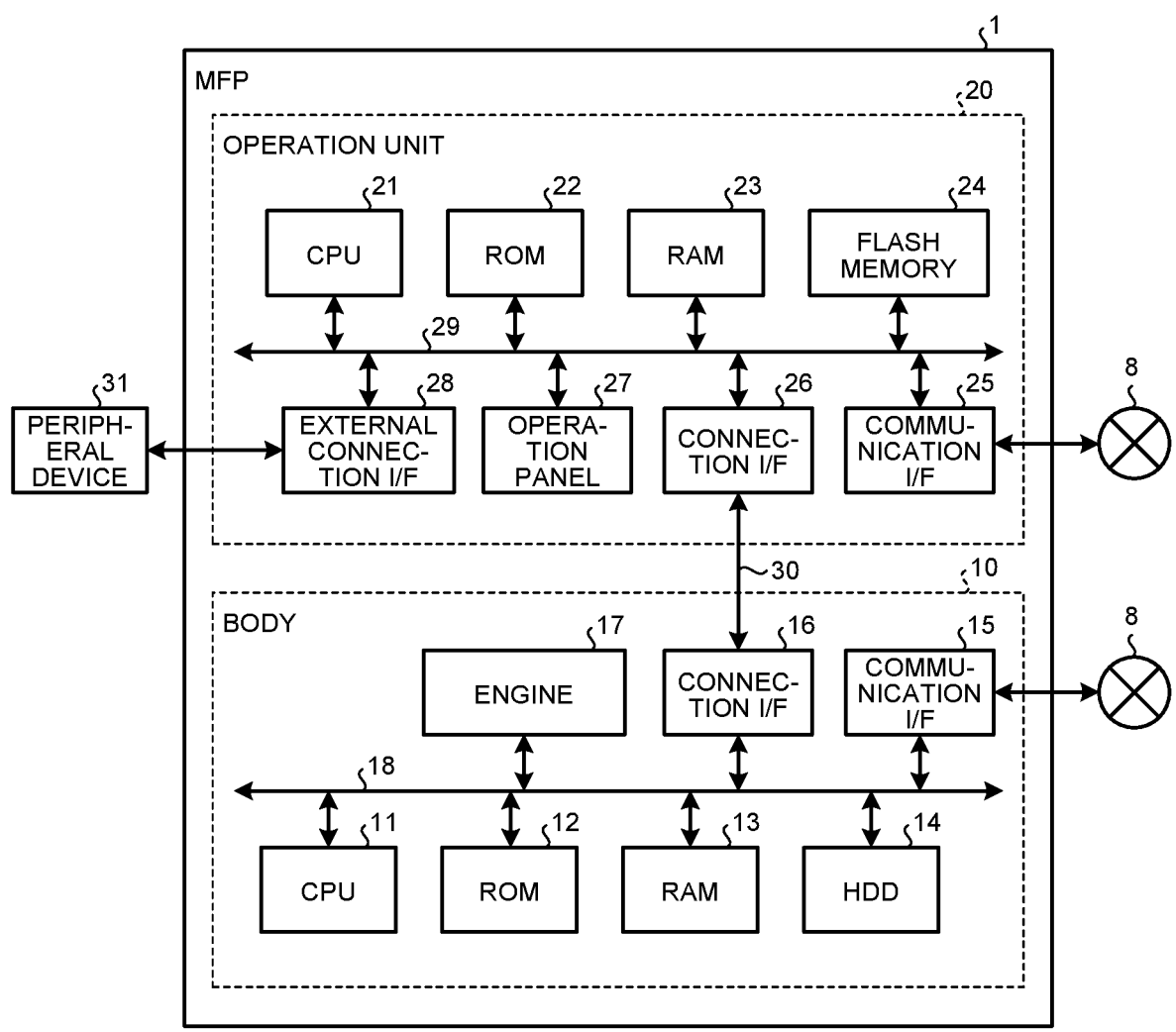
FIG. 2 is a diagram of an exemplary hardware configuration of an MFP.

Next, a hardware configuration of the MFP 1 will be described with reference to FIG. 2. As illustrated in FIG. 2, the MFP 1 includes a body 10 and an operation unit 20 which receives an operation by the user. The body 10 can realize various functions such as the copy function, the scanner function, the fax function, and the printer function. The reception of the operation by the user is a concept including the reception of information input according to the operation by the user (including a signal and/or the like indicating a coordinate value of the screen). The body 10 and the operation unit 20 are connected to each other via a dedicated communication path 30 so as to communicate with each other. For example, the communication path 30 of a universal serial bus (USB) standard can be used. However, the communication path 30 may be a communication path of any standards regardless of wired or wireless connection.

The body 10 can behave according to the operation received by the operation unit 20. Further, the body 10 can communicate with an external device such as a client personal computer (PC) and can behave according to an instruction received from the external device.

First, a hardware configuration of the body 10 will be described. As illustrated in FIG. 2, the body 10 includes a CPU 11, ROM 12, RAM 13, a hard disk drive (HDD) 14, a communication interface (I/F) 15, a connection I/F 16, and an engine 17. These are connected to each other via a system bus 18.

The CPU 11 totally controls behavior of the body 10. The CPU 11 controls the behavior of the whole body 10 by executing a program stored in the ROM 12, the HDD 14, or the like while using the RAM 13 as a work area (work region). Then, the CPU 11 realizes various functions such as the copy function, the scanner function, the fax function, and the printer function.

The communication I/F 15 is an interface to connect to the network 8. The connection I/F 16 is an interface to communicate with the operation unit 20 via the communication path 30.

The engine 17 is hardware which performs processing other than general information processing and communication to realize the copy function, the scanner function, the fax function, and the printer function. For example, the engine 17 includes a scanner (image reader) for reading an image of the document by scanning it, a plotter (image forming unit) for printing the image on a sheet material such as paper, and a facsimile for performing fax communication. In addition, the engine 17 can include a specific option such as a finisher for sorting the printed sheet materials and an automatic document feeding device (ADF) for automatically feeding the documents.

Next, a hardware configuration of the operation unit 20 will be described. As illustrated in FIG. 2, the operation unit 20 includes a CPU 21, ROM 22, RAM 23, flash memory 24, a communication I/F 25, a connection I/F 26, an operation panel 27, and an external connection I/F 28. These components are connected to each other via a system bus 29.

The CPU 21 totally controls the behavior of the operation unit 20. The CPU 21 controls the behavior of the whole operation unit 20 by executing a program stored in the ROM 22, the flash memory 24, or the like while using the RAM 23 as a work area (work region). Then, the CPU 21 realizes various functions to be described later such as a display of information (image) according to the input received from the user.

The communication I/F 25 is an interface to connect to the network 8. The connection I/F 26 is an interface to communicate to the body 10 via the communication path 30.

The operation panel 27 receives various inputs according to the operation by the user and displays various pieces of information (for example, information according to the received operation, information indicating behavior condition of the MFP 1, and information indicating a setting state). In this example, the operation panel 27 includes a liquid crystal display device (LCD) with a touch panel function implemented. However, the operation panel 27 is not limited to this. For example, the operation panel 27 may includes an organic EL display with the touch panel function implemented. In addition to this or instead of this, an operation unit such as a hardware key and a display unit such as a lamp can be provided.

The external connection I/F 28 is an interface to connect to the peripheral device 31. For example, the external connection I/F 28 is an interface to connect to hardware including an image processing apparatus such as a camera, a voice input/output device such as a microphone and a speaker, and a card reader/writer.

Figure 3:
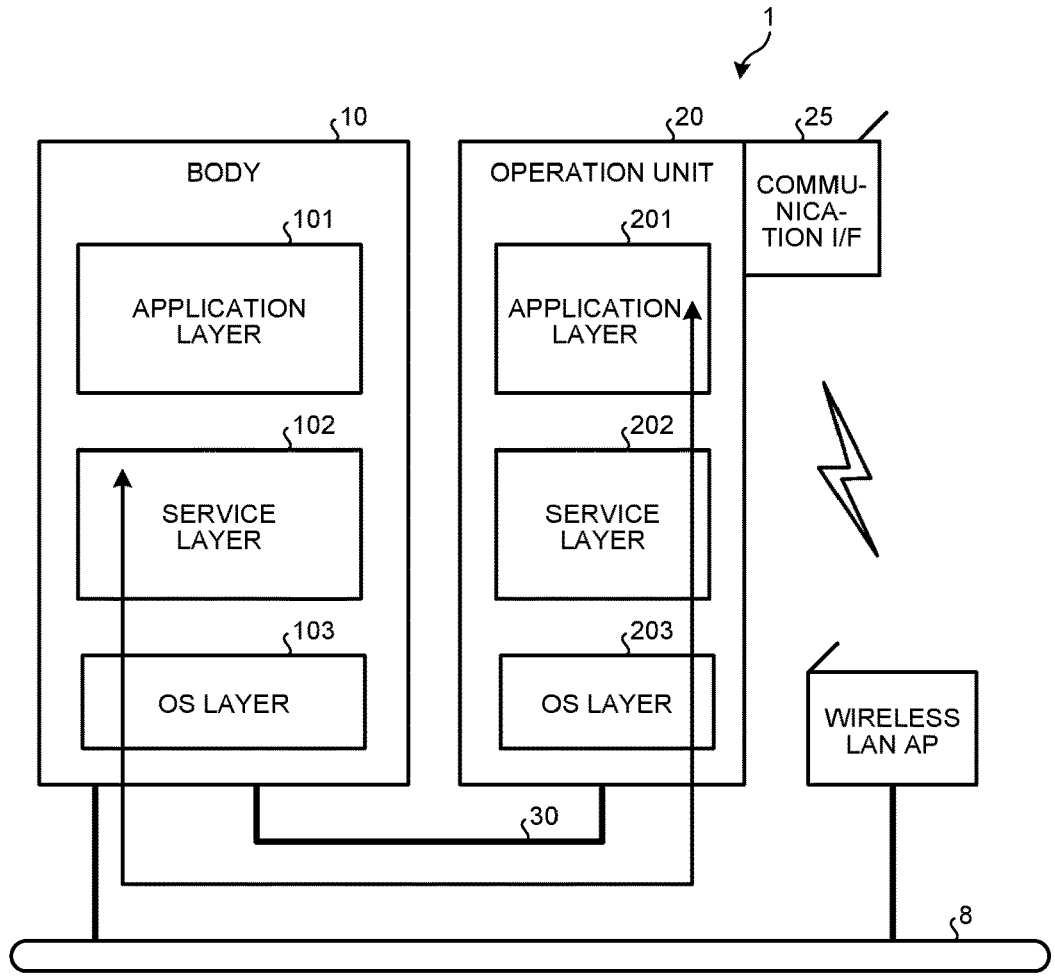
FIG. 3 is a diagram of an exemplary software configuration of the MFP.

Next, a software configuration of the MFP 1 will be described. FIG. 3 is a schematic diagram of an exemplary software configuration of the MFP 1. As illustrated in FIG. 3, the body 10 includes an application layer 101, a service layer 102, and an OS layer 103. Entities of the application layer 101, the service layer 102, and the OS layer 103 are various types of software stored in the ROM 12, the HDD 14, and/or the like. The CPU 11 executes these types of software so that various functions are provided.

The software of the application layer 101 is an application software (may be simply referred to as "application" below) to operate hardware resources and provide a predetermined function. For example, as the application, a copy application to provide the copy function, a scanner application to provide the scanner function, a fax application to provide the fax function, and a printer application to provide the printer function are exemplified.

The software of the service layer 102 is provided between the application layer 101 and the OS layer 103 and provides the application with an interface to use the hardware resources included in the body 10. More specifically, the software of the service layer 102 is software to provide a function to receive a behavior request to the hardware resource and arbitrate the behavior request. Requests to read by the scanner and to print by the plotter are conceivable as the behavior request received by the service layer 102.

The function of the interface by the service layer 102 is provided for not only the application layer 101 of the body 10 but also an application layer 201 of the operation unit 20. That is, also, the application layer 201 (application) of the operation unit 20 can realize the function by using the hardware resources of the body 10 (for example, engine 17) through the interface function of the service layer 102.

The software of the OS layer 103 is basic software (operating system (OS)) to provide a basic function to control the hardware included in the body 10. The software of the service layer 102 converts a request to use the hardware resource from various applications into a command, which can be interpreted by the OS layer 103, and transmits it to the OS layer 103. The software of the OS layer 103 executes the command so that the hardware resource behaves according to the request from the application.

Similarly, the operation unit 20 includes the application layer 201, a service layer 202, and an OS layer 203. The application layer 201, the service layer 202, and the OS layer 203 included in the operation unit 20 have a layered structure similar to that of the body 10. However, a function provided by the application of the application layer 201 and a kind of the behavior request which can be received by the service layer 202 are different from those of the body 10. The application of the application layer 201 may be software to operate the hardware resource included in the operation unit 20 and provide a predetermined function. However, the application of the application layer 201 is software which mainly provides a function of a user interface (UI) to perform operation and display regarding the functions (copy function, scanner function, fax function, and printer function) of the body 10. The application of the application layer 201 includes the store starting application, the installation application, and the browser application.

In the present embodiment, in order to maintain independence of the function, the software of the OS layer 103 of the body 10 is different from that of the OS layer 203 of the operation unit 20. That is, the body 10 and the operation unit 20 independently behave by using different operating systems. For example, it is possible to use the Linux (registered trademark) as the software of the OS layer 103 of the body 10 and use the Android (registered trademark) as the software of the OS layer 203 of the operation unit 20.

As described above, in the MFP 1 according to the present embodiment, the body 10 and the operation unit 20 behave by using different operating systems. Therefore, communication between the body 10 and the operation unit 20 is performed not as inter-process communication in a common device but as communication between different devices. This includes behavior to transmit the information received by the operation unit 20 (instruction content from user) to the body 10 (command communication), and behavior to inform the operation unit 20 of an event by the body 10. Here, the operation unit 20 performs the command communication with the body 10, and accordingly, the function of the body 10 can be used. Further, as the event of which the body 10 notifies the operation unit 20, an execution state of the behavior of the body 10, a content set to the body 10, and the like can be exemplified.

Further, in the present embodiment, since the power is supplied from the body 10 to the operation unit 20 via the communication path 30, power supply control of the operation unit 20 can be separately (independently) performed from that of the body 10.

Figure 4:
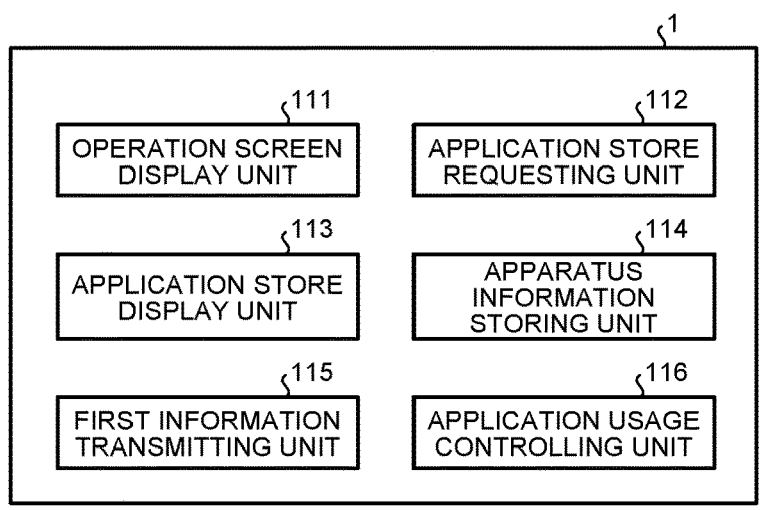
FIG. 4 is a block diagram of an exemplary function configuration of the MFP.

Next, a function configuration of the MFP 1 will be described. FIG. 4 is a block diagram of an exemplary function configuration of the MFP 1. As illustrated in FIG. 4, the MFP 1 includes an operation screen display unit 111, an application store requesting unit 112, an application store display unit 113, an apparatus information storing unit 114, a first information transmitting unit 115, and an application usage controlling unit 116. For convenience of description, functions according to the present invention are mainly exemplified in FIG. 4. However, the function of the MFP 1 is not limited to these.

Figure 5:
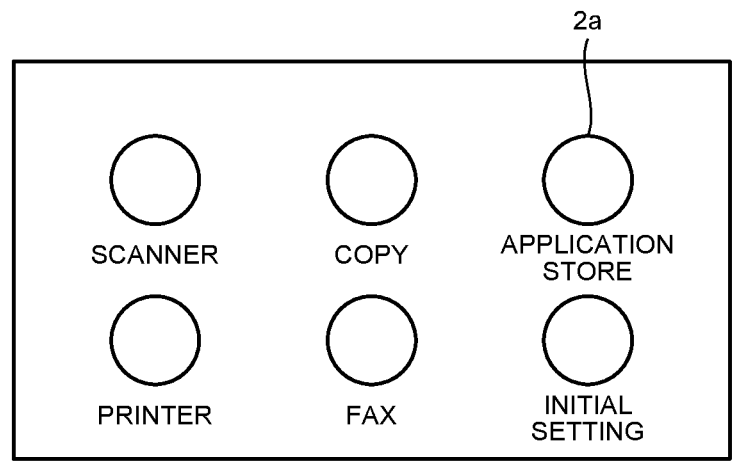
FIG. 5 is a diagram of an exemplary operation screen.

The operation screen display unit 111 performs control to display an operation screen to perform various operations, on the operation panel 27. FIG. 5 is a diagram of an exemplary operation screen, and an icon 2a to start the store starting application is displayed on the operation screen.

When the user touches the icon 2a, the store starting application is started. Then, the store starting application (application store requesting unit 112) performs control to request the application store 5 from the application store server 50. More specifically, the store starting application (application store requesting unit 112) transmits a signal for requesting the application store 5 (may be referred to as "application store request" below), to the application store server 50.

Figure 6:
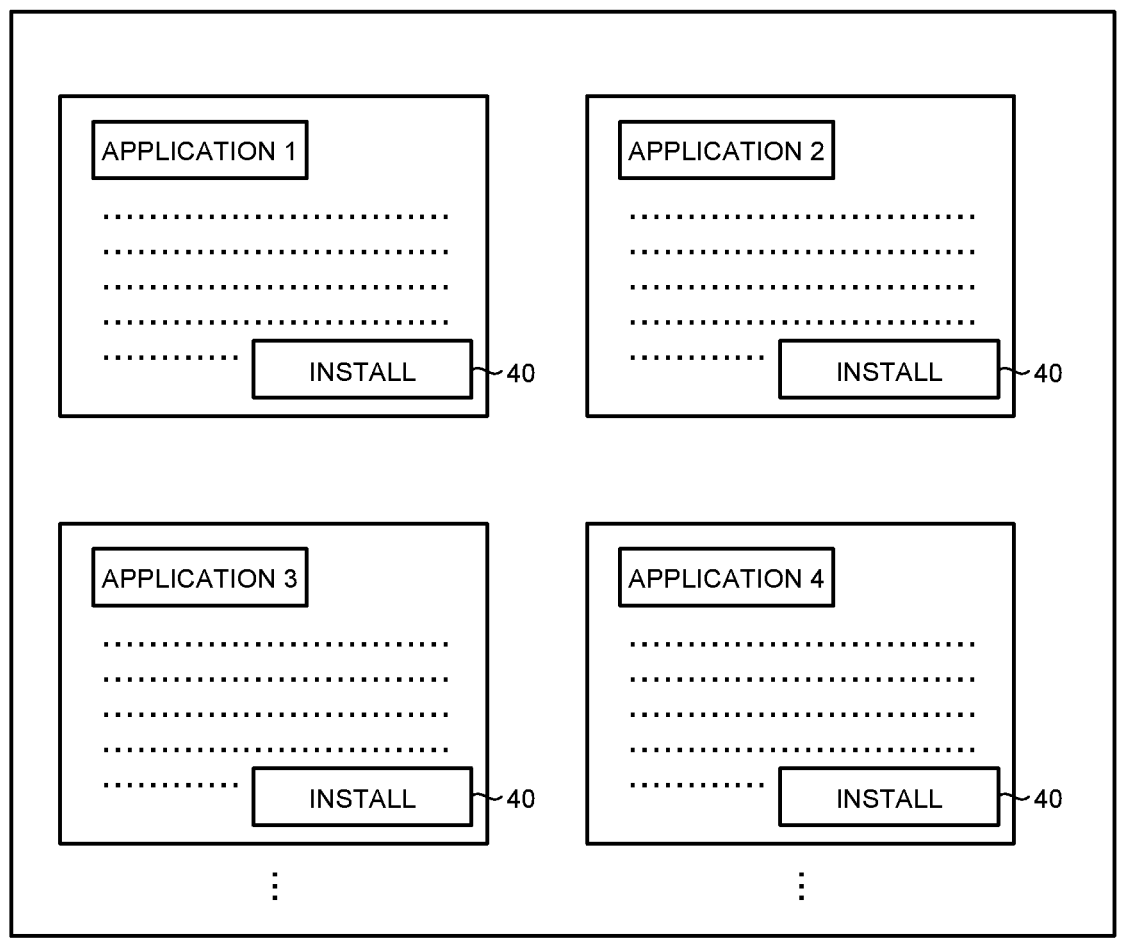
FIG. 6 is a diagram of an exemplary application store.

The description of FIG. 4 will be continued. The application store display unit 113 performs control to display the application store 5 received from the application store server 50, on the operation panel 27 as the application store request. FIG. 6 is a diagram of an exemplary application store 5 (Web page). In the example in FIG. 6, the application store 5 displays explanatory information to explain a content of each application and a button to instruct to use the application (in this example, button 40 to instruct to install the application, may be referred to as "install button 40" below).

The description of FIG. 4 will be continued. The apparatus information storing unit 114 stores apparatus information which includes peripheral device connection information and indicates a function of the apparatus. The peripheral device connection information indicates whether the apparatus (MFP 1 in this example) is connected to the peripheral device 31. The apparatus information according to the present embodiment is information in which component identification information which identifies each component which is a unit to provide a specific function is associated with application identification information which identifies the application which has been installed in the apparatus, firmware identification information which identifies firmware which has been installed in the apparatus, version information which indicates an attribute of the component identified by the component identification information and indicates a value that increases every time the component is changed, and peripheral device connection information which indicates whether the peripheral device 31 is necessary for that component identified by that component identification information.

Figure 7:
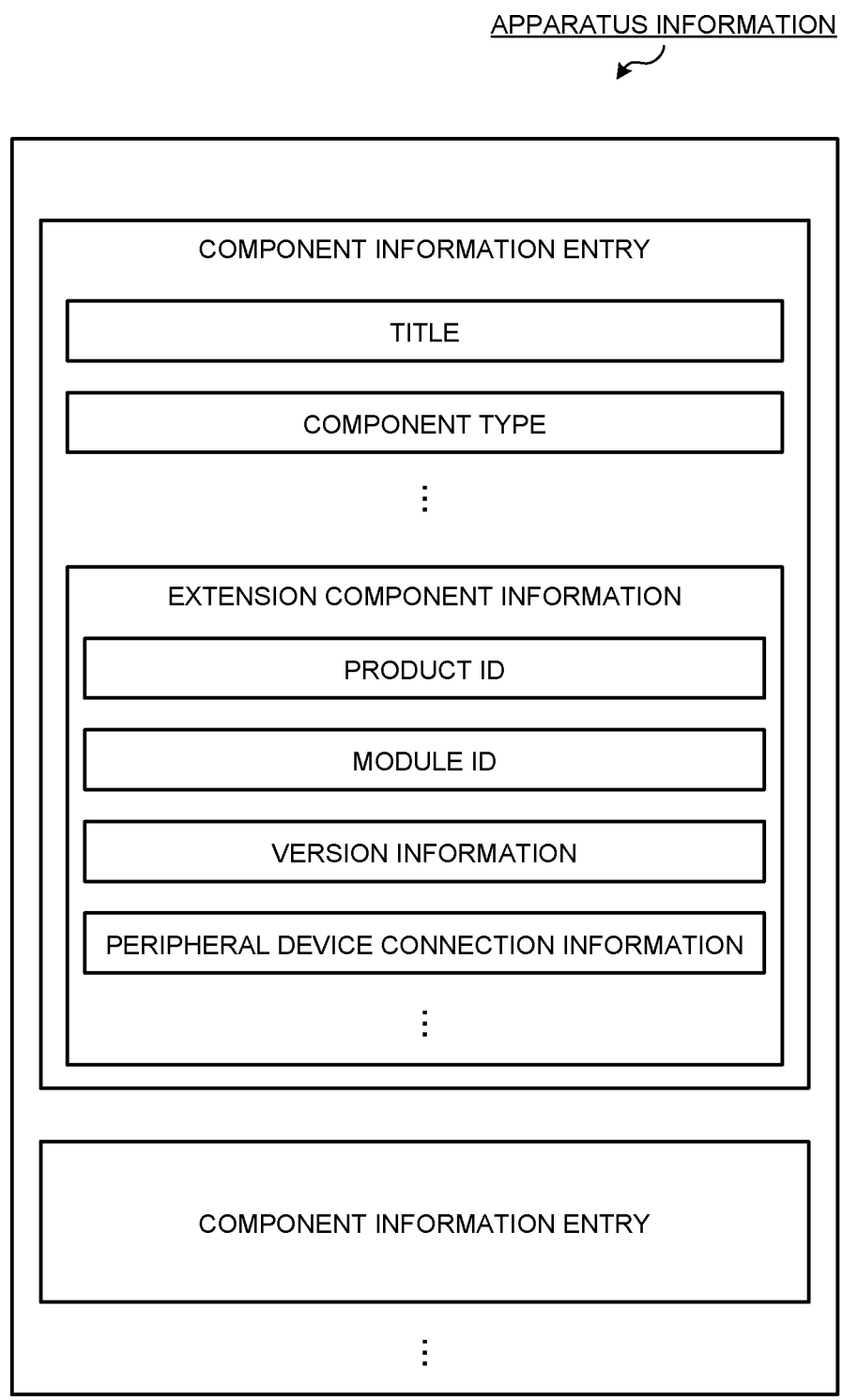
FIG. 7 is a diagram of exemplary apparatus information.

FIG. 7 is a diagram of exemplary apparatus information. In the present embodiment, the apparatus information includes a plurality of component information entries corresponding to a plurality of kinds of components one to one. Each component information entry has information in which at least a title indicating a name of the corresponding component, a component type indicating the kind of the corresponding component, and extension component information are associated with each other. In this example, it can be considered that the title or the component type corresponds to "component identification information" in claims.

The extension component information includes a product ID (corresponding to application identification information) for identifying the application which has been installed in the MFP 1 (application which is necessary to provide the component corresponding to the component information entry to which the extension component information belongs). Further, the extension component information includes a module ID (corresponding to firmware identification information) for identifying the firmware which has been installed in the MFP 1 (firmware which is necessary to provide the component corresponding to the component information entry to which the extension component information belongs). Further, the extension component information includes the version information of the component corresponding to the component information entry to which the extension component information belongs. In addition, the extension component information includes the peripheral device connection information indicating whether the peripheral device 31, which is necessary for the component corresponding to the component information entry to which the extension component information belongs, is connected.

Incidentally, the MFP 1 according to the present embodiment has a function to update the apparatus information stored in the apparatus information storing unit 114 each time the application and the firmware are newly installed or updated.

The description of FIG. 4 will be continued. The first information transmitting unit 115 transmits first information including the apparatus information stored in the apparatus information storing unit 114 and the application identification information for identifying the application required to be used by the apparatus (MFP 1 in this example), to the component server 3. Here, the application identification information included in the first information (application identification information associated with the apparatus information included in the first information) is information for identifying the application selected as the application used by the MFP 1 via the application store 5. In the present embodiment, when the install button 40 of any application in the application store 5 displayed on the operation panel 27 has been pressed, the first information transmitting unit 115 generates the first information in which the product ID for identifying the application (application required to be used by the MFP 1) and the apparatus information stored in the apparatus information storing unit 114 at this time are associated with each other. The first information transmitting unit 115 transmits the generated first information to the component server 3.

When the component server 3 has determined that the application required to be used by the MFP 1 can be used, the application usage controlling unit 116 performs control to cause the MFP 1 to use the application. More specific behavior will be described later.

Figure 8:
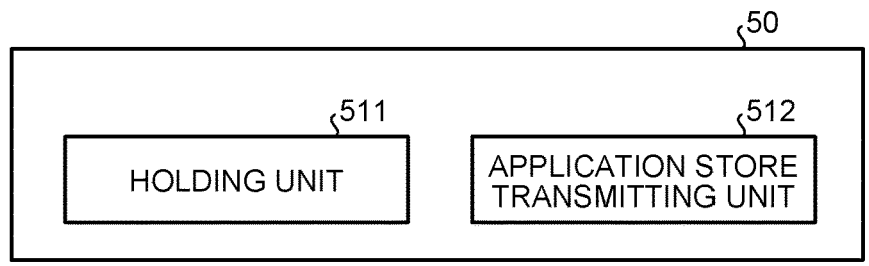
FIG. 8 is a diagram of an exemplary function configuration of an application store server.

Next, a function configuration of the application store server 50 will be described with reference to FIG. 8. As illustrated in FIG. 8, the application store server 50 includes a holding unit 511 and an application store transmitting unit 512. For convenience of description, the functions according to the present invention are mainly illustrated in FIG. 8. However, the functions of the application store server 50 are not limited to these.

The holding unit 511 holds the application store 5. When receiving the application store request from the MFP 1, the application store transmitting unit 512 transmits the application store 5 held by the holding unit 511 to the MFP 1 as a response.

Figure 9:
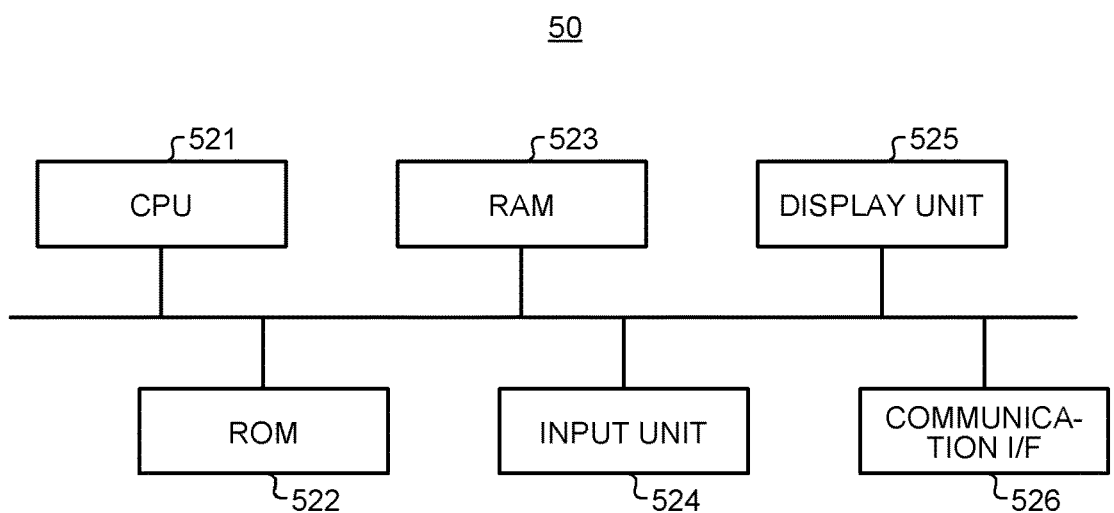
FIG. 9 is a diagram of an exemplary hardware configuration of the application store server.

FIG. 9 is a diagram of an exemplary hardware configuration of the application store server 50. As illustrated in FIG. 9, the application store server 50 includes a CPU 521, ROM 522, RAM 523, an input unit 524, a display unit 525, and a communication I/F 526. The CPU 521 totally controls behavior of the application store server 50. The ROM 522 is nonvolatile memory for storing various data such as a program. The RAM 523 is volatile memory which functions as a work region (work area) of various processing performed by the CPU 521. The input unit 524 is a device used to input an operation by the user and includes, for example, a mouse and a keyboard. The display unit 525 is a device for displaying various pieces of information and includes a liquid crystal display apparatus, for example. The communication I/F 526 is an interface to connect to the network 8.

In the present embodiment, the function of the application store transmitting unit 512 is realized by executing the program stored in the ROM 522 or the like by the CPU 521. However, the realizing method is not limited to this, and the function of the application store transmitting unit 512 may be realized by a dedicated hardware circuit (such as semiconductor integrated circuit). Further, the holding unit 511 is realized by, for example, the ROM 522 or the RAM 523.

Figure 10:
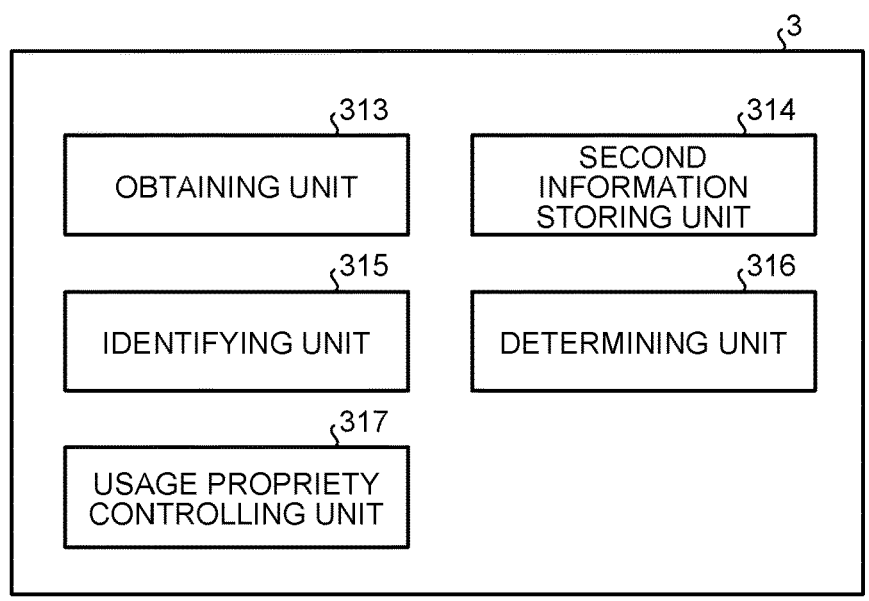
FIG. 10 is a diagram of an exemplary function configuration of a component server.

Next, a function configuration of the component server 3 will be described with reference to FIG. 10. As illustrated in FIG. 10, the component server 3 includes an obtaining unit 313, a second information storing unit 314, an identifying unit 315, a determining unit 316, and a usage propriety controlling unit 317. For convenience of description, the functions according to the present invention are mainly illustrated in FIG. 10. However, the functions of the component server 3 are not limited to these.

The obtaining unit 313 obtains the first information. The second information storing unit 314 stores second information in which each application is associated with condition information indicating a necessary condition to use that application. The condition information according to the present embodiment includes the application identification information for identifying the application necessary to use the corresponding application, the firmware identification information for identifying the firmware necessary to use the corresponding application, lower limit version information indicating a lower limit value of the version information of the component necessary to use the corresponding application, and the peripheral device identification information for identifying the peripheral device 31 necessary to use the corresponding application.

Figure 11:
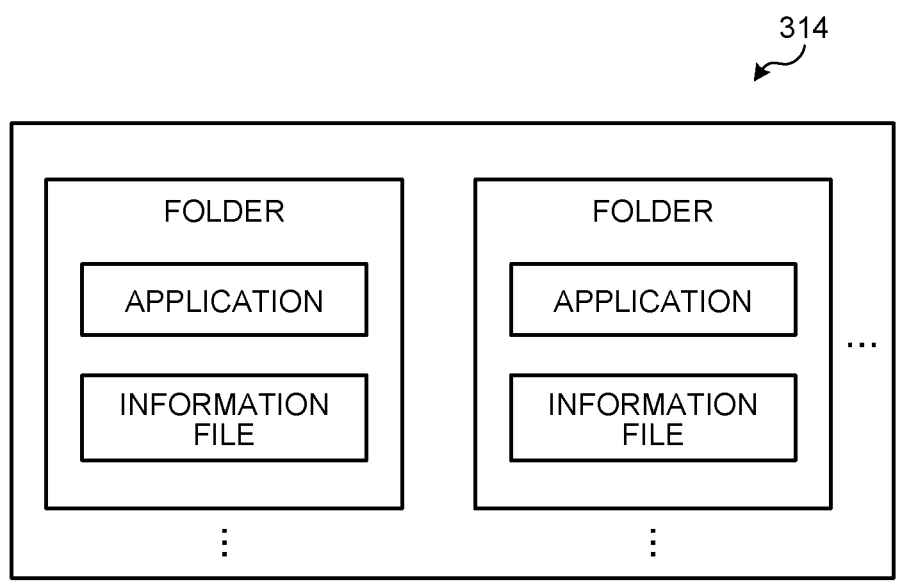
FIG. 11 is a diagram of an exemplary data structure stored in a second correspondence information storing unit.

As illustrated in FIG. 11, the second information storing unit 314 according to the present embodiment has a plurality of folders corresponding to the plurality of applications one to one. Each folder associates the corresponding application with an information file in which a condition necessary to use that application has been written (corresponding to the "condition information" described above). The folder is not limited to this. For example, a single folder may store a plurality of data sets (pair) of the application and the information file. In this example, it can be considered that a group of the data sets each includes an application and an information file corresponds to the second information.

Figure 12:
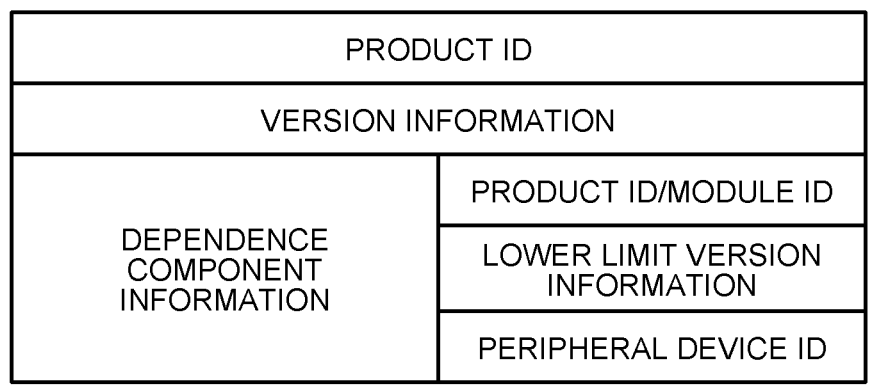
FIG. 12 is a diagram of an exemplary information file.

FIG. 12 is a diagram of an exemplary information file. As illustrated in FIG. 12, the information file includes the product ID for identifying the corresponding application, the version information of the application, and dependence component information indicating a condition necessary to use the corresponding application. In the example in FIG. 12, the dependence component information includes the product ID for identifying the application necessary to use the corresponding application (from the other perspective, application which has dependency relation with the corresponding application), the module ID for identifying the firmware necessary to use the application (from the other perspective, firmware which has dependency relation with the corresponding application), lower limit version information of a component necessary to use the application (from the other perspective, component which has dependency relation with the corresponding application), and a peripheral device ID (corresponding to the peripheral device identification information) for identifying the peripheral device 31 necessary to use the corresponding application.

The description of FIG. 10 will be continued. The identifying unit 315 refers to the second information in which each application is associated with the condition information indicating the condition necessary to use that application (information file in this example), and identifies condition information associated with that application identified by the application identification information (product ID in this example) associated with the apparatus information which is included in the first information obtained by the obtaining unit 313. In the present embodiment, the identifying unit 315 refers to the second information stored in the second information storing unit 314, identifies the product ID which coincides with the product ID associated with the apparatus information included in the first information obtained by the obtaining unit 313, and identifies the information file associated with the identified product ID.

The determining unit 316 determines whether the application which is identified by the application identification information included in the first information can be used based on the apparatus information included in the first information obtained by the obtaining unit 313 and the condition information identified by the identifying unit 315. More specifically, when component identification information which is associated with the application identification information that coincides with the application identification information included in the condition information identified by the identifying unit 315, is associated with the firmware identification information that coincides with the firmware identification information included in the condition information, is associated with version information equal to or more than a value indicated by the lower limit version information included in the condition information, and is associated with peripheral device connection information indicating that the peripheral device identified by the peripheral device identification information included in the condition information is connected, exists in the apparatus information included in the first information obtained by the obtaining unit 313, the determining unit 316 determines that the application identified by the application identification information (application identification information for identifying the application required to be used by the MFP 1) included in the first information obtained by the obtaining unit 313 can be used.

In the present embodiment, when the title or the component type which is associated with extension component information including the product ID which coincides with the product ID included in the information file identified by the identifying unit 315, the module ID which coincides with the module ID included in the information file, the version information equal to or more than a value indicated by the lower limit version information included in the information file, and the peripheral device connection information which indicates that the peripheral device identified by the peripheral device ID included in the information file is connected, exists in the apparatus information included in the first information obtained by the obtaining unit 313, the determining unit 316 determines that the application identified by the product ID (product ID associated with the apparatus information included in the first information) included in the first information can be used.

When the determining unit 316 has determined that the application identified by the application identification information (product ID in this example) included in the first information obtained by the obtaining unit 313 can be used, the usage propriety controlling unit 317 performs control to cause the apparatus (MFP 1 in this example) to use the application. When the determining unit 316 has determined that the application identified by the application identification information included in the first information cannot be used, the usage propriety controlling unit 317 performs control to cause the apparatus not to use the application.

In the present embodiment, when the determining unit 316 has been determined that the application can be used, the usage propriety controlling unit 317 notifies the MFP 1 of the URL of the download server 4 for holding (managing)

the application. The application usage controlling unit 116 of the MFP 1 which has received this notification performs control to use the application held by the download server 4 in cooperation with the download server 4. In this example, the application usage controlling unit 116 performs control to download the application held by the download server 4 from the download server 4 and install it in the MFP 1. However, the operation is not limited to this. For example, when the application held by the download server 4 is a Web application indicating an application used via the network, the application usage controlling unit 116 can perform processing to use the Web application by accessing the download server 4 (for example, processing for registering user information which uniquely identifies the user) without downloading the application from the download server 4.

Further, in the present embodiment, when the determining unit 316 has determined that the application cannot be used, the usage propriety controlling unit 317 notifies the MFP 1 of inhibition of the use of the application. The application usage controlling unit 116 of the MFP 1 which has received this notification displays, on the operation panel 27, an error screen for informing that the application selected via the application store 5 cannot be used.

A subject for generating the error screen may be the MFP 1 or may be the component server 3. For example, a form in which the usage propriety controlling unit 317 of the component server 3 generates the error screen and transmits it to the MFP 1 along with notification of the inhibition of the use of the application, may be employed.

Figure 13:
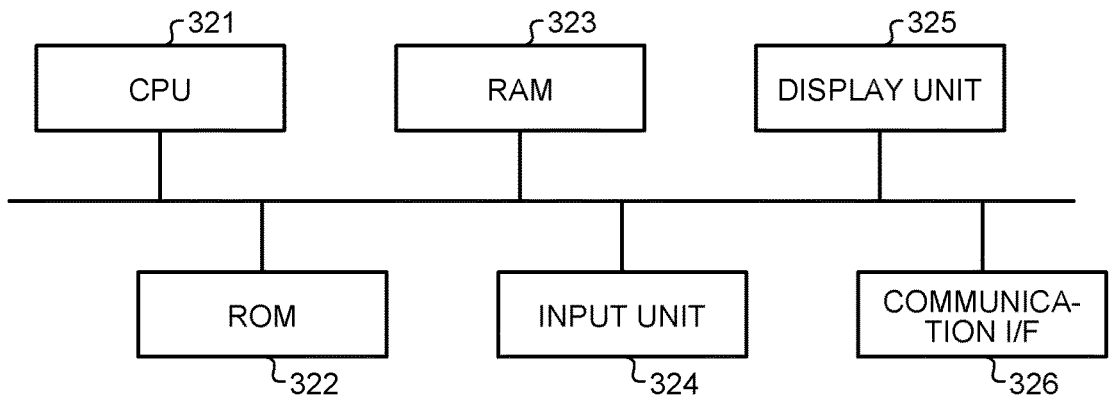
FIG. 13 is a diagram of an exemplary hardware configuration of the component server.

FIG. 13 is a diagram of an exemplary hardware configuration of the component server 3. As illustrated in FIG. 13, the component server 3 includes a CPU 321, ROM 322, RAM 323, an input unit 324, a display unit 325, and a communication I/F 326. The CPU 321 totally controls behavior of the component server 3. The ROM 322 is nonvolatile memory for storing various data such as a program. The RAM 323 is volatile memory which functions as a work region (work area) of various processing performed by the CPU 321. The input unit 324 is a device used to input an operation by the user and includes, for example, a mouse and/or a keyboard. The display unit 325 is a device for displaying various pieces of information and includes a liquid crystal display apparatus, for example. The communication I/F 326 is an interface to connect to the network 8.

In the present embodiment, the function of each unit of the component server 3 (the obtaining unit 313, the identifying unit 315, the determining unit 316, and the usage propriety controlling unit 317) is realized by executing a program stored in the ROM 322 or the like by the CPU 321. However, the realizing method is not limited to this. For example, at least a part of the function of each unit of the component server 3 may be realized by a dedicated hardware circuit (semiconductor integrated circuit or the like). Further, the second information storing unit 314 is realized, for example, by the ROM 322 and the RAM 323. In this example, it can be considered that the component server 3 corresponds to an "information processing apparatus" in claims.

Further, for example, the functions of the respective units of the component server 3 may be implemented in a plurality of servers in a distributed manner. Further, for example, a single server into which the component server 3 and the application store server 50 are integrated may be provided. In addition, for example, a single server into which the component server 3, the application store server 50, and the download server 4 are integrated may be provided. In a word, it is preferable that the information processing system 100 to which the present invention is applied have the apparatus corresponding to the MFP 1 and the server which can communicate with the apparatus via the network 8 (server including at least the function of the obtaining unit 311, the function of the identifying unit 315, and the function of the determining unit 316, and that is the component server 3 in the embodiment as an example).

Figure 14:
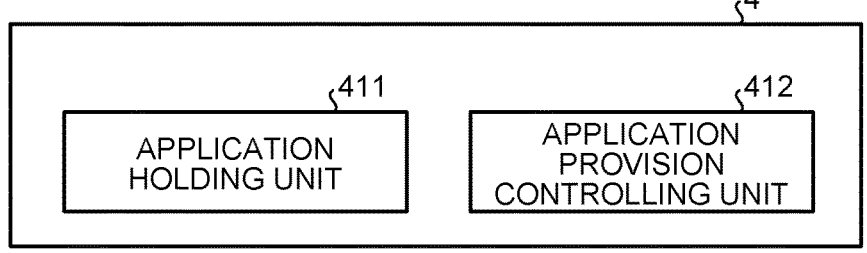
FIG. 14 is a diagram of an exemplary function configuration of a download server.

Next, a function configuration of the download server 4 will be described with reference to FIG. 14. As illustrated in FIG. 14, the download server 4 includes an application holding unit 411 and an application provision controlling unit 412. The function of the download server 4 is not limited to this.

The application holding unit 411 holds the application displayed in the application store 5. The application provision controlling unit 412 performs control to provide the application held by the application holding unit 411 to the MFP 1. In this example, the application provision controlling unit 412 performs control to download the application held by the application holding unit 411 to the MFP 1 according to the request from the MFP 1. However, the control is not limited to this.

Figure 15:
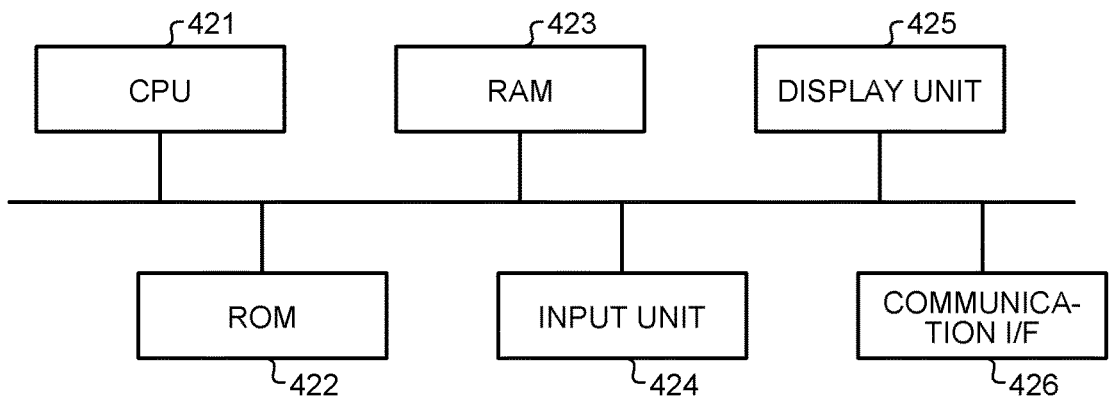
FIG. 15 is a diagram of an exemplary hardware configuration of the download server.

FIG. 15 is a diagram of an exemplary hardware configuration of the download server 4. As illustrated in FIG. 15, the download server 4 includes a CPU 421, ROM 422, RAM 423, an input unit 424, a display unit 425, and a communication I/F 426. The CPU 421 totally controls behavior of the download server 4. The ROM 422 is nonvolatile memory for storing various data such as a program. The RAM 423 is volatile memory which functions as a work region (work area) of various processing performed by the CPU 421. The input unit 424 is a device used to input an operation by the user and includes, for example, a mouse and a keyboard. The display unit 425 is a device for displaying various pieces of information and includes a liquid crystal display apparatus, for example. The communication I/F 426 is an interface to connect to the network 8.

In the present embodiment, the function of the application provision controlling unit 412 is realized by performing the program stored in the ROM 422 or the like by the CPU 421. However, the realizing method is not limited to this. For example, the function of the application provision controlling unit 412 may be realized by a dedicated hardware circuit (semiconductor integrated circuit or the like). Further, the application holding unit 411 is realized, for example, by the ROM 422 and the RAM 423.

Figure 16:
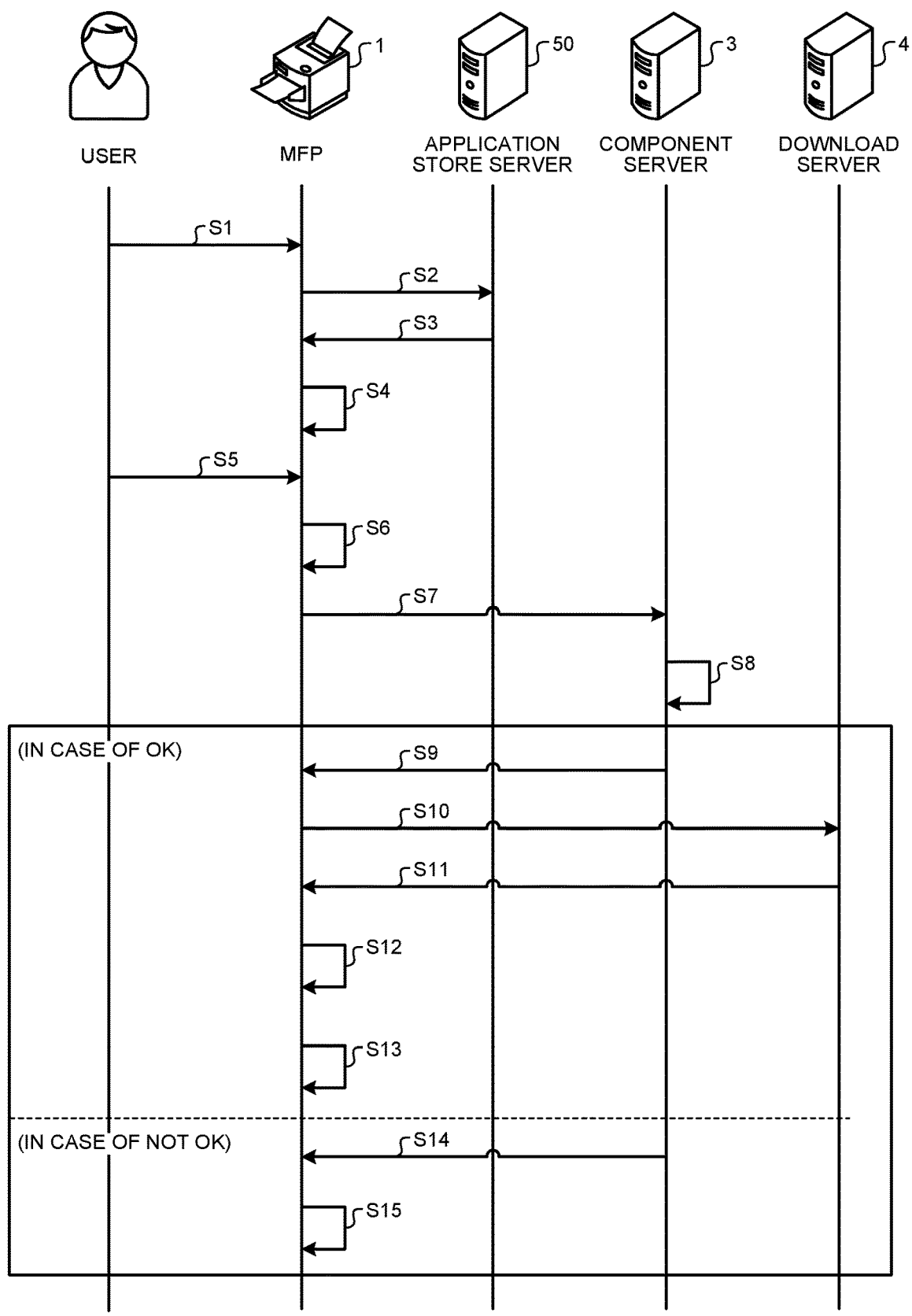
FIG. 16 is a sequence diagram of an exemplary operation procedure of an information processing system.

FIG. 16 is a sequence diagram of an exemplary operation procedure of the information processing system 100 according to the present embodiment. First, when the user touches the icon 2a (refer to FIG. 5) on the operation screen (step S1), the store starting application is started. The store starting application transmits the application store request to the application store server 50 by using the browser application (step S2). The store starting application receives the application store 5 from the application store server 50 as a response (step S3) and displays the received application store 5 on the operation panel 27 (step S4).

Next, when the user presses the install button 40 of any one of applications on the application store 5 (step S5), the MFP 1 (first information transmitting unit 115) generates the first information in which the product ID for identifying the application is associated with the apparatus information stored in the apparatus information storing unit 114 at that time (step S6). The MFP 1 (first information transmitting unit 115) transmits the first information generated in step S6 to the component server 3 (step S7), and the component server 3 (obtaining unit 313) obtains the first information.

Next, the component server 3 (identifying unit 315) refers to the second information stored in the second information storing unit 314, identifies the product ID which coincides with the product ID included in the first information obtained from the MFP 1, and identifies the information file associated with the identified product ID. The component server 3 (determining unit 316) determines whether the application identified by the product ID included in the first information can be used based on the apparatus information included in the first information obtained from the MFP 1 and the identified condition information (step S8). The specific content is as described above. The processing after that will be separated into two cases and described below. The two cases include a case where it has been determined that the application identified by the product ID included in the first information obtained from the MFP 1 can be used (a case of "OK") and a case where it has been determined that the application cannot be used (a case of "not OK").

Figure 17:
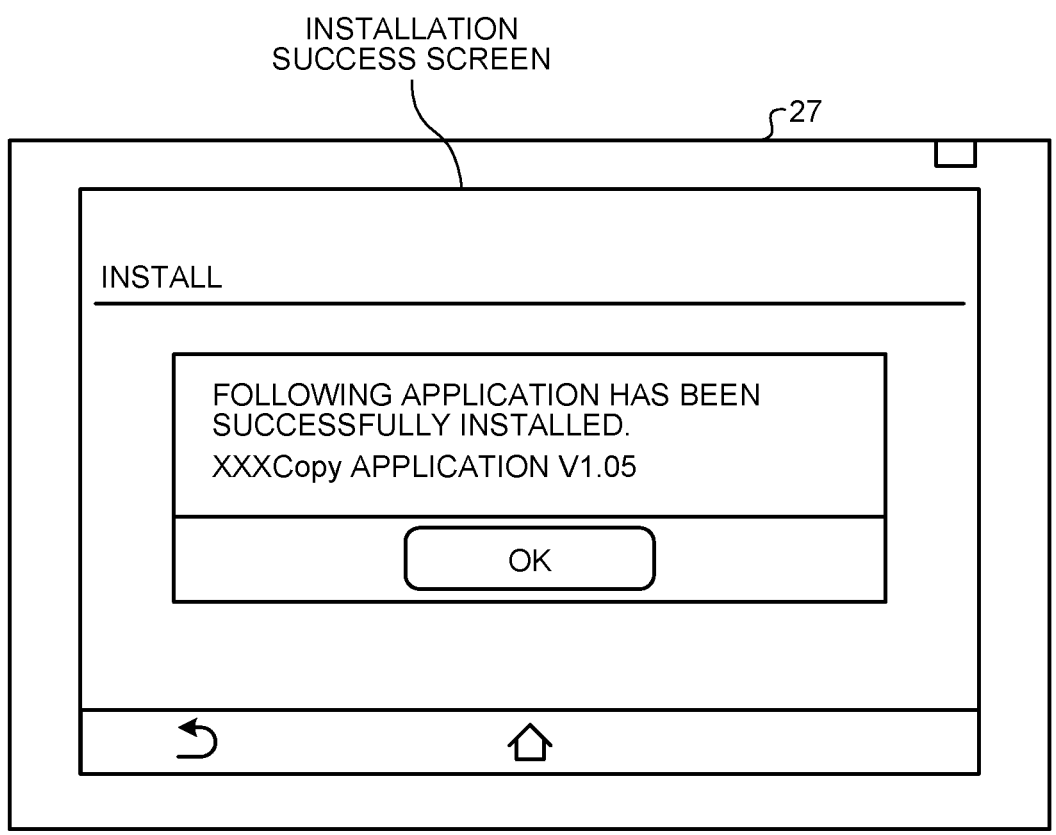
FIG. 17 is a diagram of an exemplary installation success screen.

First, the case where it has been determined that the application identified by the product ID included in the first information obtained from the MFP 1 can be used (a case of "OK") will be described as an example. In this case, the component server 3 (usage propriety controlling unit 317) notifies the MFP 1 of the URL of the download server 4 (step S9). The MFP 1 (application usage controlling unit 116) which has received this notification accesses the download server 4 (step S10) and downloads the application (application selected via the application store 5) from the download server 4 (step S11). The MFP 1 (application usage controlling unit 116) performs control to install the application downloaded in step S11 (step S12). When the install has been successfully performed, the MFP 1 (application usage controlling unit 116) performs control to display a screen to inform that the application has been successfully installed (installation success screen), such as a screen illustrated in FIG. 17, on the operation panel 27 (step S13).

Next, the case where it has been determined that the application identified by the product ID included in the first information obtained from the MFP 1 cannot be used (a case of "not OK") will be described as an example. In this case, the component server 3 (usage propriety controlling unit 317) notifies the MFP 1 of the inhibition of the use of the application identifies by the product ID included in the first information (step S14). The MFP 1 (application usage controlling unit 116) which has received this notification cannot use the application selected via the application store 5 and performs control to display the error screen on the operation panel 27 (step S15).

As described above, when the component server 3 according to the present embodiment obtains the first information which includes the apparatus information including the peripheral device connection information indicating whether the peripheral device 31 is connected to the MFP 1 and indicates a function that the MFP 1 has and the product ID for identifying the application which is required to be used by the MFP 1, the component server 3 refers to the second information in which each application is associated with the information file indicating the condition necessary to use that application and identifies the information file associated with the application identified by the product ID included in the first information. It is determined whether the application identified by the product ID included in the first information can be used based on the apparatus information included in the first information and the identified information file. That is, in the present embodiment, it is determined whether the application required to be used by the MFP 1 can be used while considering the connection state of the peripheral device 31 to the MFP 1. Therefore, a failure such that it is found that the application cannot be used after the application has been downloaded and installed and a failure such that the MFP 1 is not normally operated can be prevented. According to this, the convenience of the user can be improved.

Although the embodiment according to the present invention has been described above, the present invention is not limited to the above-mentioned embodiment. In an implementing stage, the embodiment can be materialized by modifying the components without departing from the scope of the invention. Further, various inventions can be formed by an appropriate combination of a plurality of components disclosed in the above-mentioned embodiment. For example, some components may be deleted from all the components illustrated in the embodiment.

The respective functions of the units of the MFP 1 described above (the operation screen display unit 111, the application store requesting unit 112, the application store display unit 113, first information transmitting unit 115, and the application usage controlling unit 116) are realized by executing the program stored in a storage device (for example, ROM 12, a HDD 14, ROM 22, and flash memory 24) by the CPU (11 or 21). However, the structure is not limited to this, and, for example, at least a part of the functions of the units of the MFP 1 may be realized by a dedicated hardware circuit (for example, a semiconductor integrated circuit). Further, the apparatus information storing unit 114 is realized by a storage device (such as ROM 12, a HDD 14, ROM 22, and flash memory 24) mounted on the MFP 1.

Further, in the above-mentioned embodiment, the body 10 and the operation unit 20 independently behave by using different operation systems. However, they are not limited to this, and for example, the body 10 and the operation unit 20 may behave by using the same operation system.

Further, the program executed by the information processing system 100 (such as the MFP 1, the component server 3, and the download server 4) in the embodiment described above may be provided by recording it to a recording medium such as a CD-ROM, a flexible disk (FD), a CD-R, a digital versatile disk (DVD), and a universal serial bus (USB) which can be read by the computer by using a file in a format which can be installed or performed. Further, the program may be provided or distributed via a network such as the Internet. Further, various programs may be provided by previously integrating it into the ROM or the like.

According to an embodiment, an application can be downloaded based on a peripheral device connected to an information processing apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:
1. An information processing system comprising:
   an image forming apparatus including a printer or a scanner; and
   a server configured to communicate with the image forming apparatus via a network, wherein
   the image forming apparatus includes:
      an interface configured to connect with a peripheral device, the peripheral device including at least one of a camera, a microphone, a speaker and a card reader, an operation panel configured to receive an input of an operation instruction for the printer or the scanner, a display configured to display information thereon, and circuitry configured to,
receive a list of applications and display same on the display, and
in response to receiving, via the operation panel, a selection from a user of an application to be used by the image forming apparatus from among the list of applications, transmit first information and application identification information to the server, the first information including apparatus information which includes peripheral device connection information indicating whether the peripheral device is connected via the interface and indicates a function that the image forming apparatus has, the application identification information identifying the application requested to be used by the image forming apparatus by the user through the operation panel, and the server includes circuitry configured to:
transmit the list of applications to the image forming apparatus,
obtain the first information,
identify, within second information stored in a database in the sever, condition information associated with the application identified by the application identification information included in the first information, the condition information including at least peripheral device identification information listing the peripheral device necessary to use the application,
determine, after the selection from the user of the application to be used by the image forming apparatus, whether the application identified by the application identification information included in the first information generated in response to the selection by the user can be used based on whether the peripheral device connection information and the peripheral device identification information indicate that the peripheral device necessary to use the application is connected to the image forming apparatus,
transmit an address to the image forming apparatus for downloading the application from a download server, in response to a determination that the application can be used, the download server being a separate server from the server including the database, and
transmit error information to the image forming apparatus in response to a determination that the application cannot be used, wherein
upon installation of the application, the image forming apparatus is configured to display, via the display, a first message indicating that the application has been installed successfully, and
upon receipt of the error information, the image forming apparatus is configured to display, via the display, a second message indicating inhibition of use of the application.

2. The information processing system according to claim 1, wherein
the apparatus information includes component identification information, firmware identification information, version information and the peripheral device connection information for the image forming apparatus, the component identification information identifying each component which is a unit to provide a specific function is associated with application identification information which identifies an application installed in the image forming apparatus, the firmware identification information identifying firmware installed in the image forming apparatus, the version information identifying an attribute of that component identified by that component identification information and indicates a value that increases every time that component is changed, and the condition information includes application identification information, firmware identification information, lower limit version information, and the peripheral device identification information, the application identification information identifying an application necessary to use a corresponding application, the firmware identification information identifying firmware necessary to use the corresponding application, the lower limit version information identifying a lower limit value of version information of a component necessary to use the application.

3. The information processing system according to claim 2, wherein
when the apparatus information includes the component identification information, the firmware identification information, the version information and the peripheral device connection information that coincides with the component identification information, the application identification information, the lower limit version information, and the peripheral device identification information included in the condition information, respectively, the circuitry determines that the application can be used, the version information coinciding with the lower limit version information when the version information is equal to or greater than the lower limit version information.

4. The information processing system according to claim 1, wherein the address is one of a uniform resource locator (URL) and an internet protocol (IP) address associated with the application.

5. The information processing system according to claim 1, wherein the circuitry of the server is configured to determine whether the application can be used based on the first information such that the circuitry of the server determines that the peripheral device can be used when the peripheral device is connected via the interface to the image forming apparatus.

6. The information processing system according to claim 1, wherein (i) a component server configured to determine whether the application can be used based on the database stored therein, (ii) the download server configured to store the application for downloading, and (iii) an application store server configured to transmit the list of applications to the image forming apparatus are each separate servers.

7. An information processing apparatus comprising:
circuitry configured to,
transmit a list of applications to an image forming apparatus,
obtain first information and application identification information, the first information including apparatus information which includes peripheral device connection information indicating whether a peripheral device is connected via an interface of the image forming apparatus and indicates a function of the image forming apparatus, and the application identification information identifying a selection from a user of an application from among the list of applications through an operation panel, the image forming apparatus including a printer or a scanner,
identify, within second information stored in a database in the information processing apparatus, condition information associated with the application identified by the application identification information included in the first information, the condition information including at least peripheral device identification information listing the peripheral device necessary to use the application,
determine, after the selection from the user of the application to be used by the image forming apparatus, whether the application identified by the application identification information included in the first information generated in response to the selection by the user can be used based on whether the peripheral device connection information and the peripheral device identification information indicate that the peripheral device necessary to use the application is connected to the image forming apparatus,
transmit an address to the image forming apparatus for downloading the application from a download server in response to a determination that the application can be used, the download server being a separate server from the server including the database, and
transmit error information to the image forming apparatus in response to a determination that the application cannot be used, wherein
upon installation of the application, the image forming apparatus is configured to display, via a display associated therewith, a first message indicating that the application has been installed successfully, and
upon receipt of the error information, the image forming apparatus is configured to display, via the display, a second message indicating inhibition of use of the application.

8. The information processing apparatus according to claim 7, wherein the address is one of a uniform resource locator (URL) and an internet protocol (IP) address associated with the application.

9. The information processing apparatus according to claim 7, wherein the circuitry is configured to determine whether the application can be used based on the first information such that the circuitry determines that the peripheral device can be used when the peripheral device is connected via the interface to the image forming apparatus.

10. An information processing method performed by a server, the information processing method comprising:
transmitting a list of applications to an image forming apparatus;
obtaining first information and application identification information, the first information including apparatus information which includes peripheral device connection information indicating whether a peripheral device is connected via an interface of the image forming apparatus and indicates a function of the image forming apparatus, and the application identification information identifying a selection from a user of an application from among the list of applications through an operation panel, the image forming apparatus including a printer or a scanner;
identifying, within second information stored in a database in the server, condition information associated with the application identified by the application identification information included in the first information, the condition information including at least peripheral device identification information listing the peripheral device necessary to use the application;
determining, after the selection from the user of the application to be used by the image forming apparatus, whether the application identified by the application identification information included in the first information generated in response to the selection by the user can be used based on whether the peripheral device connection information and the peripheral device identification information indicate that the peripheral device necessary to use the application is connected to the image forming apparatus;
transmitting an address to the image forming apparatus for downloading the application from a download server in response to a determination that the application can be used, the download server being a separate server from the server including the database; and
transmitting error information to the image forming apparatus in response to a determination that the application cannot be used, wherein
upon installation of the application, the image forming apparatus is configured to display, via a display associated therewith, a first message indicating that the application has been installed successfully, and
upon receipt of the error information, the image forming apparatus is configured to display, via the display, a second message indicating inhibition of use of the application.

11. The information processing method according to claim 10, wherein the address is one of a uniform resource locator (URL) and an internet protocol (IP) address associated with the application.

12. The information processing method according to claim 10, wherein the determining determines whether the application can be used based on the first information such that the determining determines that the peripheral device can be used when the peripheral device is connected via the interface to the image forming apparatus.

* * * * *